(No Model.) 2 Sheets—Sheet 1.

O. T. SMITH.
MANUFACTURE OF BUTTONS.

No. 354,662. Patented Dec. 21, 1886.

WITNESSES: INVENTOR:

(No Model.) 2 Sheets—Sheet 2.

O. T. SMITH.
MANUFACTURE OF BUTTONS.

No. 354,662. Patented Dec. 21, 1886.

Witnesses
Charles Cheval
Fred E Goodrich

Inventor
Orville T. Smith

UNITED STATES PATENT OFFICE.

ORVILLE T. SMITH, OF BROOKLYN, NEW YORK.

MANUFACTURE OF BUTTONS.

SPECIFICATION forming part of Letters Patent No. 354,662, dated December 21, 1886.

Application filed July 26, 1886. Serial No. 209,161. (No model.)

*To all whom it may concern:*

Be it known that I, ORVILLE T. SMITH, of Brooklyn, in the county of Kings and State of New York, have invented certain Improvements in the Method of Making Buttons; and I do hereby declare that the following is a full, clear, and exact description thereof, reference being had to the accompanying drawings, in which—

Figure 1:
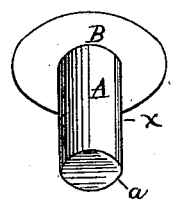
Figure 2:
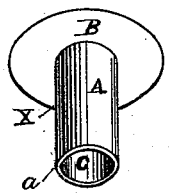
Figure 3:
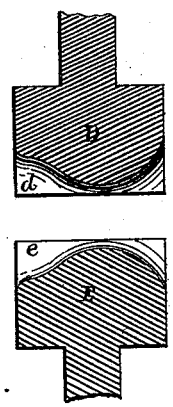
Figure 4:
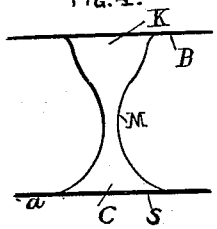
Figure 5:
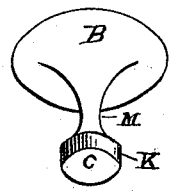
Figure 6:
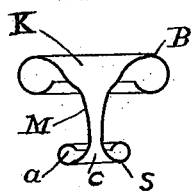
Figure 7:
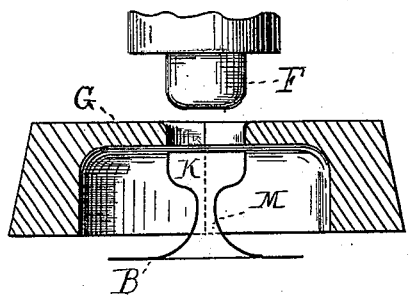
Figure 8:
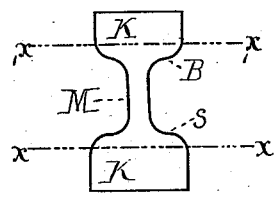
Figure 9:
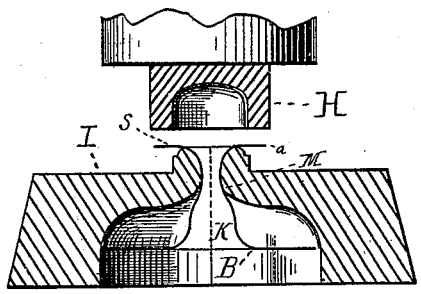
Figure 10:
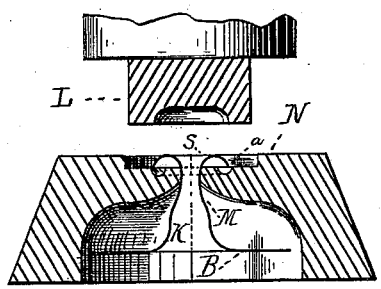
Figure 11:
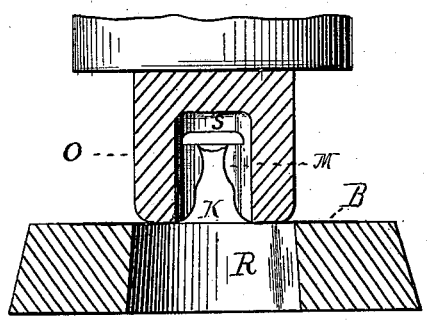
Figure 12:
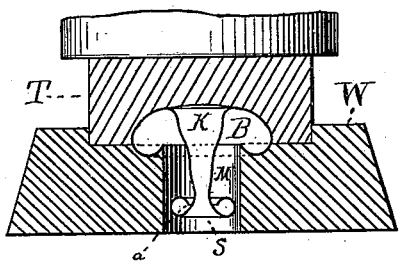

Figure 1 is a perspective view of a blank after having been operated upon by the drawing-dies. Fig. 2 is a like view of the same after having the closed end cut out. Fig. 3 is a sectional view of one set of a series of sectional dies. Fig. 4 is a front view, and Fig. 5 is a perspective view, of Fig. 2 after being operated upon by the sectional dies. Fig. 6 is a sectional view of a slightly-modified form of the one seen in Fig. 4. Fig. 7 is a cross-sectional view of a sectional drawing-die, showing the punch withdrawn after operating to form the cup-shaped end shown in Fig. 5. Fig. 8 is a front view of a slightly-modified form as embodied in my invention, and will be hereinafter described. Fig. 9 is a section of a punch and sectional die ready for operating on the form shown in Fig. 4 to produce the modified one seen in Fig. 6, the same being on a line passing axially through the stem. Fig. 10 is also a section of a punch and sectional die for completing the form produced by the punch and die shown in Fig. 9 into the shape shown in Fig. 6. Fig. 11 is a sectional view of a punch and drawing-die when combined ready for operating on the head of the button shown in Fig. 4, to produce the modified form shown in Fig. 6. Fig. 12 is a sectional view of a punch and die when combined and operating upon the outer edge as produced by the punch and die shown in Fig. 11, to give it the shape shown in Fig. 6.

Letters of like name and kind refer to like parts in each of the figures.

The object of my invention is to lessen the cost and to increase the strength of buttons; and to this end said invention consists, principally, in the method employed for forming a button from sheet metal by means of dies, substantially as and for the purpose hereinafter specified.

It further consists in the method used for forming buttons having a tubular stem without seam or joint, and provided with an opening through the head, stem, and shoe, substantially as and for the purpose hereinafter shown.

In the practice of my invention a disk or blank is cut from sheet metal, and by means of suitable dies is given the tubular shape A, with a flaring end, B. (Shown in Fig. 1.) The tubular shape A is next subjected to the action of a cutting-punch, which perforates the end $a$, producing the opening C, when it becomes a tubular blank, A, with a flaring end, B, and having an opening extending through the tubular part. The tubular blank A is next subjected at about X to the action of a series of sectional dies, two of which, D E, are only shown, which are provided within and across their contiguous faces with coinciding recesses $d\ e$, which together have the general form of the finished stem M, which they produce.

An intermittent circular motion is given the tubular blank A during the formation of the stem M by the dies D E, which operate to compress the body of the tubular blank A laterally to give to it the desired size and form. By the action of the dies D E a depression or cup-shaped termination, K, is formed on the stem M at the end having the flaring head B, and at the same operation the perforated end $a$ of the tubular blank A is flared outward to form a shoe, (designated at S,) as shown in Fig. 4.

In the drawings, Fig. 5, is shown a cup shape, K, on the perforated end $a$ of the tubular blank A, and is formed by slightly modifying the coinciding recesses $d\ e$ of the dies D E; or it may be formed by simply reversing the blank A when it is to be operated upon by the dies D E. It may also be formed from the shape seen in Fig. 4 by submitting either of the flanged ends B S, forming the head and shoe of the button, to the action of the punch F and sectional drawing-die G. (Shown in Fig. 7.)

As will be seen, the form shown in Fig. 4 is to all intents and purposes complete, in that a button is produced consisting of a tubular stem provided at opposite ends with outwardly-turned flanges, one forming the head and the other the shoe of the button, and provided with an opening through the head, stem, and shoe.

In the practice of my invention I preferably produce the modified form seen in Fig. 5.

The flaring end B is not absolutely necessary to the tubular blank A, and in the production of some forms can be dispensed with, as clearly shown in Fig. 8, wherein cup-shaped terminations K are formed on both ends of the stem M, and are produced by the dies D E operating upon the tubular blank. The flange B is here shown forming the base of one of the cup-shaped ends K, and the flange S the base of the opposite cup-shaped end K'. By cutting off both of the cup-shaped ends K at about X and flattening the flanges the form shown in Fig. 4 is produced, and by cutting off only one cup-shaped end K at about X and flattening the flange the form seen in Fig. 5 is produced. The form seen in Fig. 8 can also be produced from the form seen in Fig. 4 by the punch F and sectional drawing-die G. (Shown in Fig. 7.)

In the drawings, Fig. 6, is shown a modified form of the button seen in Fig. 4, in which the flange or flat shoe S has its edge $a$ turned or rolled inward. In producing this style of shoe the flat shoe S has its edge $a$ turned in axial line to the stem M by the action of a punch, H, and sectional die I, (shown in Fig. 9,) and the downward-turned edge $a$ is further turned inward by the action of the punch L and sectional die N. (Shown in Fig. 10.)

To complete the form shown in Fig. 6, the flanged head B of the form shown in Fig. 4 is by the action of a punch, O, pushed through a drawing-plate, R, which carries the outer edge of the flanged head B downward toward the shoe S, and is shown in Fig. 11 preparatory to being pushed through the drawing-plate R. The edge of the flange B is then further turned or rolled inward by a punch, T, and die W. (Shown in Fig. 12.)

As the tubular blank has to be annealed in its successive operations, forming the stem, the hole extending through the tubular blank prevents accumulations therein, and decreases the strain of the metal during formation of the stem, thereby enabling quicker operations in producing them.

In consequence of the compression of the metal by the operation of the dies D E, the buttons possess far greater durability than can be obtained by soldering two flanges or heads on an independent stem, as has heretofore been done.

Having thus described my invention, what I claim, and desire to secure by Letters Patent, is—

1. The novel process herein disclosed for producing buttons, consisting in, $a$, drawing blank into tubular form provided with a flaring end; $b$, perforating the closed end of the tubular blank; $c$, compressing laterally the tubular blank by a series of sectional dies provided with coinciding recesses which form the stem, with opposite ending flanges forming the head and shoe of the button.

2. The method employed for forming buttons, consisting, first, in drawing a blank or disk of sheet metal into tubular shape provided with a flaring end, next in perforating the closed end of the tubular shape, then compressing the tubular part of the blank to form a stem with a cup-shaped termination on the perforated end, substantially as herein described.

3. The method of producing buttons, consisting in, first, forming a seamless tubular blank with an opening extending entirely through it and provided with a flaring end, next compressing the tubular part to form a stem and an opposite flaring end, substantially as herein described.

4. The method of producing buttons, consisting, first, in drawing a blank or disk of sheet metal into tubular shape, next in perforating the closed end of the tubular blank, then compressing the blank to form a stem with cup-shaped terminations on both ends, substantially as herein described.

5. The method of producing buttons, which consists in, first, forming a seamless tubular blank provided at one end with a flange, then perforating the closed end of the tubular shape, next compressing the tubular part by dies which conform to the exterior of the finished stem, and which form the stem with a cup-shaped termination on the flanged end of the tubular blank, and also an outwardly-turned flange on the opposite end, substantially as herein described.

6. Means for producing a tubular blank having an opening extending through the blank, in combination with means for forming the said blank into a tubular stem provided with outwardly-turned flanges, substantially as described.

7. Means for producing a tubular blank having an opening extending through the blank, means for forming the said blank into a tubular stem provided with outwardly-turned flanges, in combination with means for turning the outwardly-turned flanges toward each other in approximately axial line to the stem, substantially as described.

ORVILLE T. SMITH.

Witnesses:
CHARLES CHEVALIER,
THOS. R. ALMOND.